(12) United States Patent
Kotani et al.

(10) Patent No.: US 8,466,413 B2
(45) Date of Patent: Jun. 18, 2013

(54) ION DETECTOR

(75) Inventors: Masahiro Kotani, Hamamatsu (JP);
Takayuki Ohmura, Hamamatsu (JP);
Motohiro Suyama, Hamamatsu (JP);
Hiroshi Kobayashi, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/192,670

(22) Filed: Jul. 28, 2011

(65) Prior Publication Data
US 2012/0025085 A1    Feb. 2, 2012

(30) Foreign Application Priority Data

Jul. 29, 2010 (JP) .............................. P2010-170608
Jul. 5, 2011 (JP) .............................. P2011-148871

(51) Int. Cl.
*H01J 49/02* (2006.01)
*H01J 43/10* (2006.01)

(52) U.S. Cl.
USPC ................... 250/281; 313/103 R; 250/361 R; 250/397

(58) Field of Classification Search
USPC ............. 250/281, 283, 299, 300, 361 R, 397; 313/103 R, 104, 105 R
See application file for complete search history.

(56) References Cited

U.S. PATENT DOCUMENTS

| 4,442,355 | A | * | 4/1984 | Tamura et al. | 250/310 |
|---|---|---|---|---|---|
| 4,810,882 | A | * | 3/1989 | Bateman | 250/281 |
| 5,202,561 | A | * | 4/1993 | Giessmann et al. | 250/281 |
| 6,025,590 | A | * | 2/2000 | Itoi | 250/281 |
| 7,728,292 | B2 | * | 6/2010 | Jolliffe et al. | 250/307 |
| 7,855,361 | B2 | * | 12/2010 | Steiner | 250/292 |
| 2006/0289748 | A1 | * | 12/2006 | Schon et al. | 250/306 |
| 2009/0294687 | A1 | * | 12/2009 | Shofman et al. | 250/397 |
| 2010/0294931 | A1 | * | 11/2010 | Zarchin et al. | 250/310 |
| 2011/0031381 | A1 | * | 2/2011 | Tay et al. | 250/226 |

FOREIGN PATENT DOCUMENTS

| FR | 2 658 361 | | | 8/1991 |
|---|---|---|---|---|
| FR | 2658361 | A1 | * | 8/1991 |
| JP | 7-326315 | | | 12/1995 |
| JP | 07326315 | A | * | 12/1995 |
| JP | 10154483 | A | * | 6/1998 |

\* cited by examiner

*Primary Examiner* — Robert Kim
*Assistant Examiner* — David E Smith
(74) *Attorney, Agent, or Firm* — Drinker Biddle & Reath LLP

(57) ABSTRACT

An ion detector for detecting positive ions and negative ions, includes a housing provided with an ion entrance to make the positive ions and the negative ions enter, a conversion dynode which is disposed in the housing and to which a negative potential is applied, a scintillator which is disposed in the housing and has an electron incident surface which is opposed to the conversion dynode and into which secondary electrons emitted from the conversion dynode are made incident, a conductive layer which is formed on the electron incident surface and to which a positive potential is applied, and a photodetector which detects light emitted by the scintillator in response to incidence of the secondary electrons.

1 Claim, 15 Drawing Sheets

Fig.13
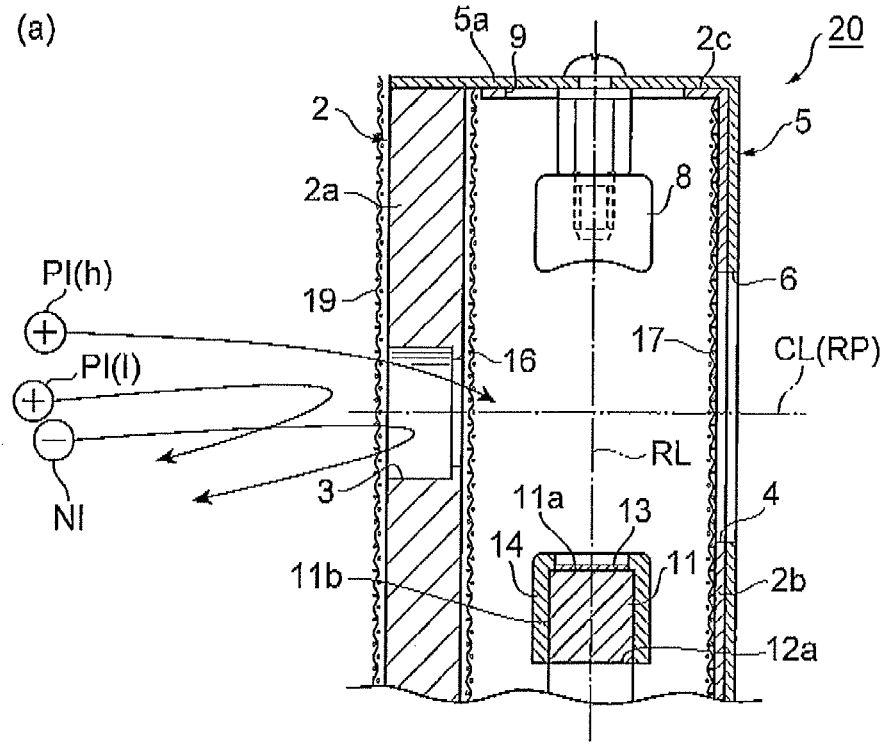
(a)
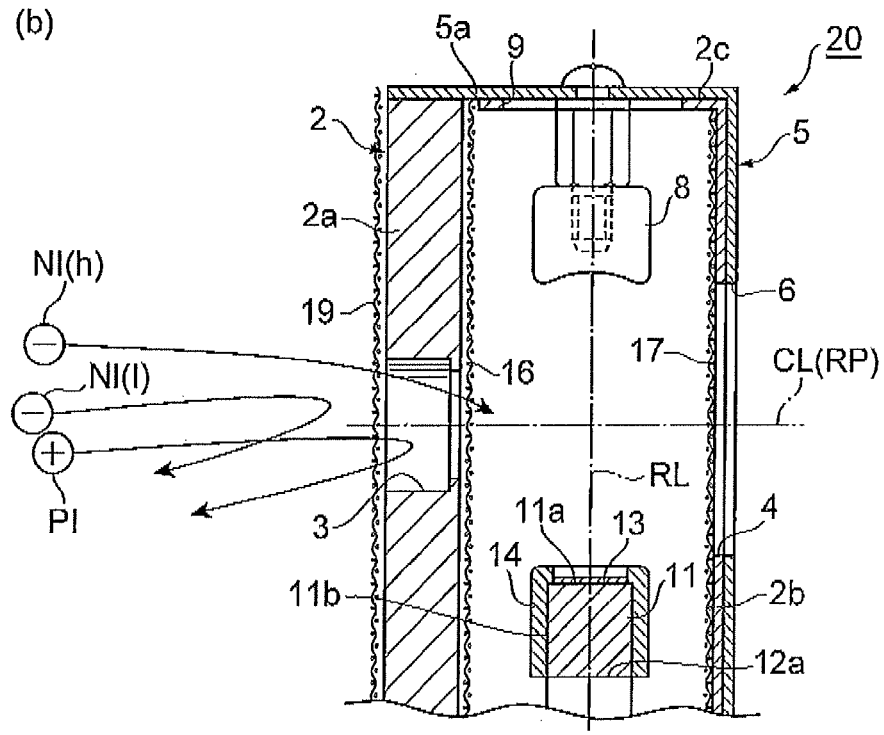
(b)

Fig.15
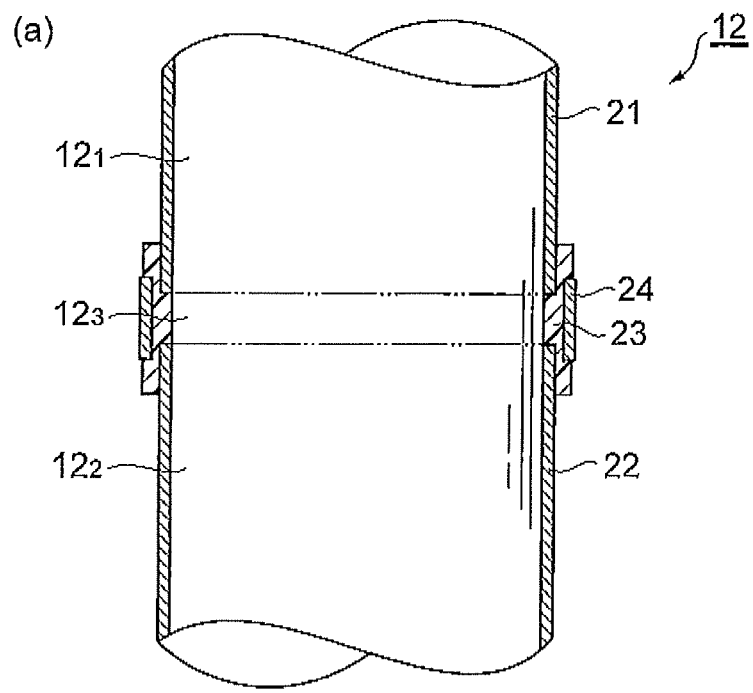
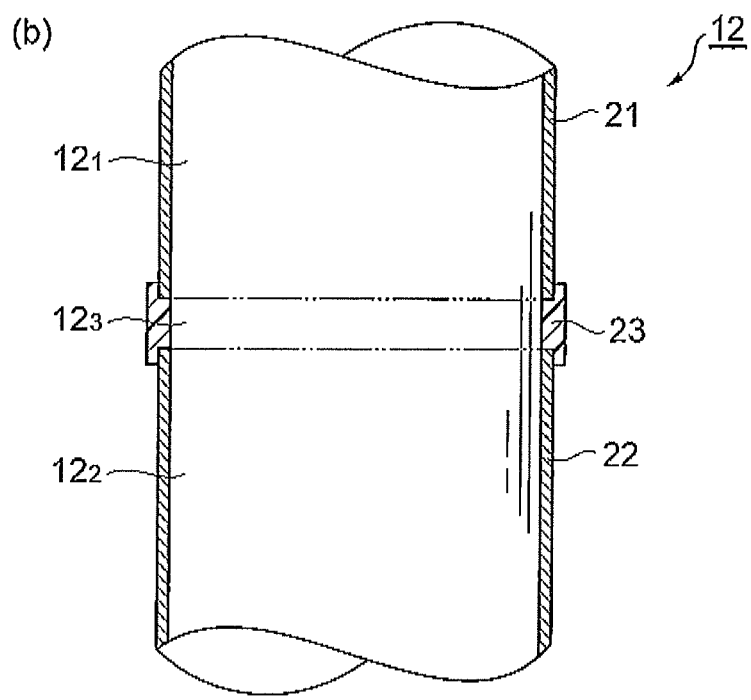

ION DETECTOR

BACKGROUND OF THE INVENTION

1. Field of the Invention

The present invention relates to an ion detector for detecting positive ions and negative ions.

2. Related Background Art

Conventional ion detectors including conversion dynodes that emit secondary electrons by ion collisions, scintillators that emit light upon incidence of the secondary electrons emitted from the conversion dynodes, photodetectors that detect the light emitted by the scintillators have been known (refer to, for example, Japanese Patent Application Laid-Open No. H07-326315, French Patent Application Laid-Open No. 2658361 (FR2658361A1)). Here, a positive ion conversion dynode to which a negative potential is applied and a negative ion conversion dynode to which a positive potential is applied are separately provided for detection of positive ions and negative ions in some cases (refer to, for example, Japanese Patent Application Laid-Open No, H07-326315).

SUMMARY OF THE INVENTION

However, in the ion detector for which a positive ion conversion dynode and a negative ion conversion dynode are separately provided, it is technically difficult to perform both attraction of negative ions and emission of secondary electrons by the negative ion conversion dynode, and the conversion efficiency from negative ions into secondary electrons is also reduced, and thus the detection efficiency of negative ions may be lowered.

It is therefore an object of the present invention to provide an ion detector that can improve the detection efficiency of positive ions and negative ions.

An ion detector of an aspect of the present invention is an ion detector for detecting positive ions and negative ions, includes a housing provided with an ion entrance to make the positive ions and the negative ions enter, a conversion dynode which is disposed in the housing and to which a negative potential is applied, a scintillator which is disposed in the housing and has an electron incident surface which is opposed to the conversion dynode and into which secondary electrons emitted from the conversion dynode are made incident, a conductive layer which is formed on the electron incident surface and to which a positive potential is applied, and a photodetector which detects light emitted by the scintillator in response to incidence of the secondary electrons.

In this ion detector, when positive ions enter into the housing via the ion entrance, the positive ions travel toward the conversion dynode to which a negative potential has been applied, and collide with the conversion dynode. When secondary electrons are emitted from the conversion dynode by the positive ion collisions, the secondary electrons travel toward the conductive layer to which a positive potential has been applied, and are made incident into the scintillator via the electron incident surface after being transmitted through the conductive layer. When light is emitted by the scintillator in response to the incidence of secondary electrons, the light is detected by a photodetector. On the other hand, when negative ions enter into the housing via the ion entrance, the negative ions travel toward the conductive layer to which a positive potential has been applied, and collide with the conductive layer. Positive ions are emitted from the conductive layer by the negative ion collisions, and the positive ions travel toward the conversion dynode to which a negative potential has been applied, and collide with the conversion dynode. When secondary electrons are emitted from the conversion dynode by the positive ion collisions, the secondary electrons travel toward the conductive layer to which a positive potential has been applied, and are made incident into the scintillator via the electron incident surface after being transmitted through the conductive layer. When light is emitted by the scintillator in response to the incidence of secondary electrons, the light is detected by a photodetector. Thus, when negative ions enter into the housing, and of course when positive ions enter into the housing, the negative ions are converted into positive ions by the conductive layer, and therefore, conversion from positive ions into secondary electrons is realized by the conversion dynode to which a negative potential has been applied, and as a result, a reduction in the conversion efficiency from positive ions and negative ions into secondary electrons is suppressed. Consequently, according to this ion detector, the detection efficiency of positive ions and negative ions can be improved.

Here, the conversion dynode and the conductive layer may be located with respect to the ion entrance so that a predetermined plane substantially perpendicular to a reference line connecting the conversion dynode and the conductive layer includes a center line of the ion entrance, and the negative potential is applied to the conversion dynode and the positive potential is applied to the conductive layer so that a negative equipotential surface formed by the conversion dynode and a positive equipotential surface formed by the conductive layer become substantially symmetrical with respect to the predetermined plane. Thereby, positive ion trajectories to the conversion dynode, negative ion trajectories to the conductive layer, and secondary electron trajectories to the scintillator can be converged, and the incidence efficiency of positive ions in the conversion dynode, the incidence efficiency of negative ions in the conductive layer, and the incidence efficiency of secondary electrons in the scintillator can be improved.

Moreover, the ion detector may include a first mesh which is placed at the ion entrance and to which a positive potential and a negative potential are selectively applied. Thereby, when positive ions are made to enter into the housing to detect the positive ions, by applying a negative potential to the first mesh, formation of a positive electric field into the ion entrance can be suppressed so as to further improve the incidence efficiency of positive ions in the conversion dynode. On the other hand, when negative ions are made to enter into the housing to detect the negative ions, by applying a positive potential to the first mesh, formation of a negative electric field into the ion entrance can be suppressed so as to further improve the incidence efficiency of negative ions in the conductive layer.

Further, the ion detector may include a second mesh which is placed at the ion entrance so as to be located at an outer side than the first mesh and to which a positive potential and a negative potential are selectively applied so as to have an absolute value smaller than that of a potential to be applied to the first mesh and so as to have a polarity opposite to that of a potential to be applied to the first mesh. Thereby, when positive ions are made to enter into the housing to detect the positive ions, by applying a positive potential to the second mesh, positive ions of relatively low energies can be repulsed so as to pass only positive ions of relatively high energies. At this time, negative ions are repulsed by the first mesh to which a negative potential has been applied. On the other hand, when negative ions are made to enter into the housing to detect the negative ions, by applying a negative potential to the second mesh, negative ions of relatively low energies can be repulsed so as to pass only negative ions of relatively high energies. At this time, positive ions are repulsed by the first mesh to which a positive potential has been applied. The energies of ions to be noise are often lower than those of ions that need to be detected. Therefore, by preventing entrance into the housing of ions of relatively low energies, the S/N ratio of the ion detector can be improved.

Moreover, the ion detector may include an electrode layer which is formed on the scintillator so as to surround the conductive layer and to which a positive potential is applied. Thereby, when negative ions enter into the housing, divergence of positive ions emitted from the conductive layer by negative ion collisions can be suppressed so as to further improve the incidence efficiency of positive ions in the conversion dynode.

Moreover, the ion detector may include a pair of electrode members which are made to have the same potential as that of the housing and which are disposed in the housing so as to be located closer to the ion entrance side than the conversion dynode and the conductive layer and so as to face each other across the ion entrance, when viewed from the ion entrance side, in a direction substantially perpendicular to a direction in which the conversion dynode and the conductive layer are opposed. Thereby, even when, for example, the ion entrance is formed so as to have a sectional shape taking as its longitudinal direction the direction in which the pair of electrode members are opposed, positive ion trajectories to the conversion dynode and negative ion trajectories to the conductive layer can be converged so as to further improve the incidence efficiency of positive ions in the conversion dynode and the incidence efficiency of negative ions in the conductive layer.

Moreover, the ion detector may include a light guide which penetrates through the housing and which has one end to which the scintillator is connected and the other end to which the photodetector is connected, and a first part at the one end side of the light guide may be covered with a first conductive film, and a second part at the other end side of the light guide may be covered with a second conductive film, and a third part between the first part and the second part of the light guide may be covered with an insulating film. Thereby, incidence of light into the light guide from the outside can be prevented by the first and second conductive films. Further, the first conductive film and the second conductive film can be insulated from each other by the insulating film.

Further, the third part may be covered with a third conductive film via the insulating film. Thereby, even when the insulating film has a low light blocking effect, incidence of light into the light guide from the outside can be prevented by the third conductive film.

BRIEF DESCRIPTION OF THE DRAWINGS

FIG. 13 includes longitudinal sectional views of the ion detector of FIG. 12 where ion trajectories are shown.

FIG. 15 includes longitudinal sectional views of other light guides of the ion detector of each embodiment.

DESCRIPTION OF THE PREFERRED EMBODIMENTS

Figure 1:
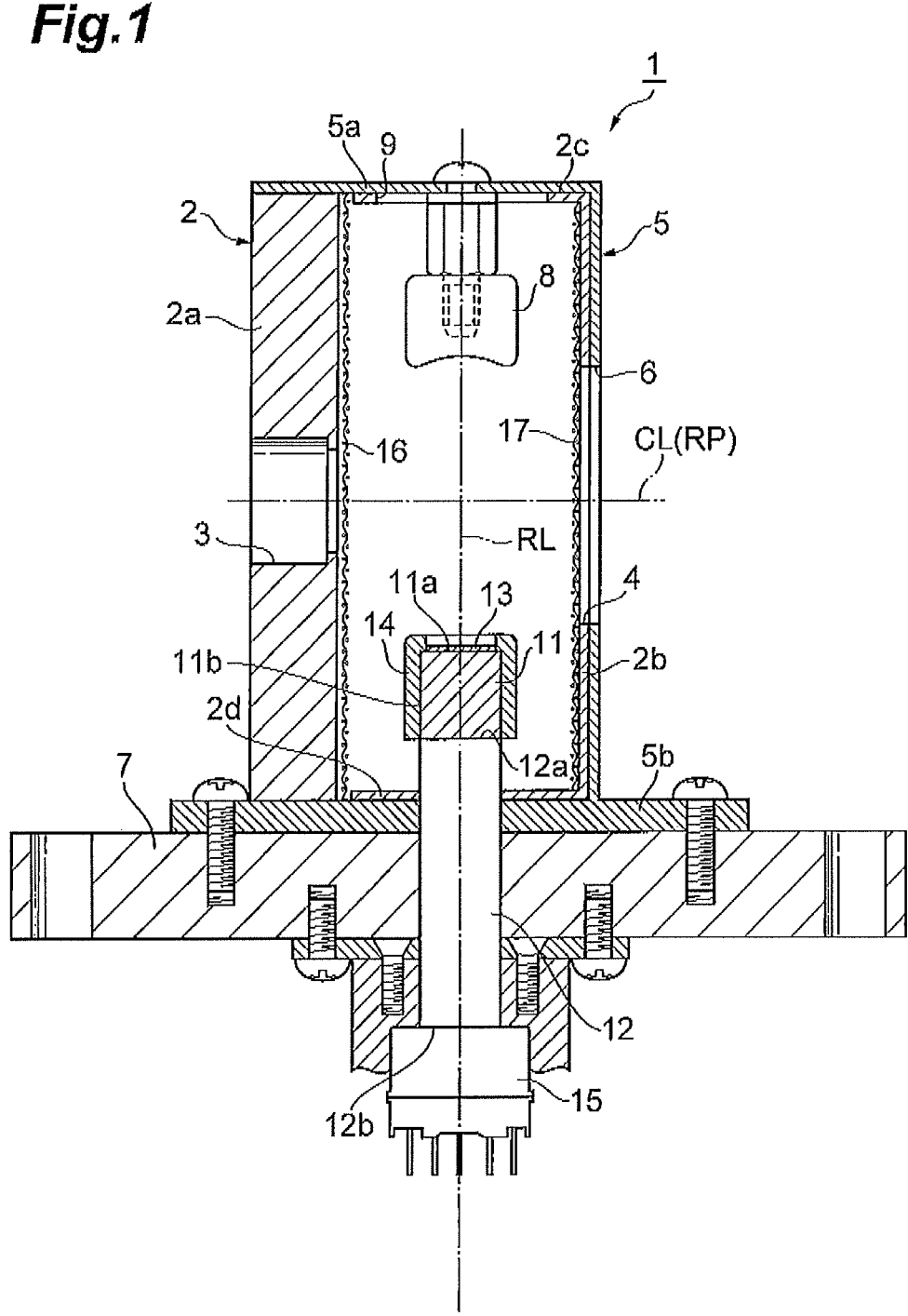
FIG. 1 is a longitudinal sectional view of an ion detector of a first embodiment of the present invention.

Hereinafter, preferred embodiments of the present invention will de described in detail with reference to the drawings. Also, the same or corresponding parts are denoted with the same reference numerals in the respective figures, and overlapping description will be omitted.

[First Embodiment]

As shown in FIG. 1, an ion detector 1 includes a rectangular parallelepiped box-shaped chamber (housing) 2 made of SUS (stainless steel). In a side wall 2a of the chamber 2, an ion entrance 3 having a circular shape in section to let positive ions and negative ions enter are provided. In a side wall 2b of the chamber 2 opposed to the side wall 2a, an opening 4 opposed to the ion entrance 3 is provided. An outer surface of the chamber 2 excluding the side wall 2a is covered with an insulating member 5 made of a PEEK (polyether ether ketone) resin. In the insulating member 5, an opening 6 is provided so as to overlap with the opening 4 of the chamber 2. A bottom wall 5b of the insulating member 5 is formed like an outward flange. To the bottom wall 5b, a mounting plate 7 to mount the ion detector 1 at a predetermined position in, for example, a device (in a mass spectrometer or the like) that is vacuumed is fixed by a screw or the like.

In the chamber 2, a column-shaped conversion dynode 8 (hereinafter, simply referred to as a "dynode 8" in the present embodiment) made of SUS is disposed. The dynode 8 is fixed, via an opening provided in a top wall 2c of the chamber 2, to a top wall 5a of the insulating member 5 by a screw or the like. Further, in the chamber 2, a column-shaped scintillator 11 formed of a plastic scintillator is disposed. The scintillator 11 is connected to one end 12a of a light guide 12 that penetrates through a bottom wall 2d of the chamber 2. While penetrating through the bottom wall 2d of the chamber 2, the bottom wall 5b of the insulating member 5, and the mounting plate 7, the light guide 12 is fixed to the mounting plate 7 by a screw or the like.

The scintillator 11 has an electron incident surface 11a that is opposed to the dynode 8 and into which secondary electrons emitted from the dynode 8 are made incident. On the electron incident surface 11a, a film-like (for example, a thickness of 50 nm to 60 nm) conductive layer 13 made of aluminum is formed as a so-called metal back. Here, a reference line RL that connects a center point of the dynode 8 and a center point of the conductive layer 13 is substantially perpendicular to a center line CL of the ion entrance 3. In other words, the dynode 8 and the conductive layer 13 are located with respect to the ion entrance 3 so that, with a predetermined plane substantially perpendicular to the reference line RL and including the center line CL provided as a reference plane RP the reference plane RP substantially perpendicular to the reference line RL includes the center line CL.

On a side surface 11b of the scintillator 11, an electrode layer 14 made of SUS is formed so as to surround the conductive layer 13. The electrode layer 14 is electrically connected to the conductive layer 13. To the other end 12b of the light guide 12, a photomultiplier tube (photodetector) 15 that converts light emitted by the scintillator 11 into electrical signals and detects the electrical signals is connected. Moreover, in the chamber 2, a mesh (first mesh) 16 made of SUS is woven so as to extend along an inner surface of the side wall 2a. The mesh 16 is placed inside of the ion entrance 3. Further, in the chamber 2, a mesh 17 made of SUS is woven so as to extend along an inner surface of the side wall 2b. The mesh 17 is placed inside of the opening 4.

In the ion detector 1 configured as in the above, the chamber 2 and the mesh 17 are grounded and maintained at 0V. For the dynode 8, a negative potential (for example, −5 kV) is applied to the chamber 2 and the mesh 17. On the other hand, for the conductive layer 13 and the electrode layer 14, a positive potential (for example, +5 kV) is applied to the chamber 2 and the mesh 17. For the mesh 16, a positive potential (for example, +0.3 kV) and a negative potential (for example, −0.3 kV) are selectively applied to the chamber 2 and the mesh 17.

Accordingly, a negative equipotential surface formed by the dynode 8 and a positive equipotential surface formed by the conductive layer 13 are made substantially symmetrical with respect to the reference plane RP. That is, it is made substantially 0V at least near an intersection between the reference plane RP and the reference line RL (specifically, near an intersection between the center line CL of the ion entrance 3 and the reference line RL).

When positive ions are detected in the ion detector 1, a negative potential (for example, −0.3 kV) is applied, to the mesh 16. Then, when positive ions enter into the chamber 2 via the ion entrance 3, the positive ions travel toward the dynode 8 to which a negative potential (for example, −5 kV) has been applied, and collide with the dynode 8. When secondary electrons are emitted from the dynode 8 by the positive ion collisions, the secondary electrons travel toward the conductive layer 13 to which a positive potential (for example, +5 kV) has been applied, and are made incident into the scintillator 11 via the electron incident surface 11a after being transmitted through the conductive layer 13. When light is emitted by the scintillator 11 in response to the incidence of secondary electrons, the light is detected by a photomultiplier tube 15 via the light guide 12.

On the other hand, when negative ions are detected in the ion detector 1, a positive potential (for example, +0.3 kV) has been applied to the mesh 16. Then, when negative ions enter into the chamber 2 via the ion entrance 3, the negative ions travel toward the conductive layer 13 to which a positive potential (for example, +5 kV) has been applied, and collide with the conductive layer 13 (negative ions are not transmitted through the conductive layer 13 because these are larger than secondary electrons). Positive ions are emitted from the conductive layer 13 by the negative ion collisions, and the positive ions travel toward the dynode 8 to which a negative potential (for example, −5 kV) has been applied, and collide with the dynode 8. When secondary electrons are emitted from the dynode 8 by the positive ion collisions, the secondary electrons travel toward the conductive layer 13 to which a positive potential (for example, +5 kV) has been applied, and are made incident into the scintillator 11 via the electron incident surface 11a after being transmitted through the conductive layer 13. When light is emitted by the scintillator 11 in response to the incidence of secondary electrons, the light is detected by a photomultiplier tube 15 via the light guide 12.

As in the above, in the ion detector 1, when negative ions enter into the chamber 2, the negative ions are converted into positive ions by the conductive layer 13. Therefore, when negative ions enter into the chamber 2, and of course when positive ions enter into the chamber 2, conversion from positive ions into secondary electrons is realized by the dynode 8, and as a result, a reduction in the conversion efficiency from positive ions and negative ions into secondary electrons is suppressed. Consequently, according to the ion detector 1, the detection efficiency of positive ions and negative ions can be improved.

That is, in the ion detector 1, by making the scintillator 11 covered with the conductive layer 13 function like a negative ion conversion dynode, the single dynode 8 suffices, and it becomes unnecessary to change the polarity of potential to be applied to the dynode 8. Moreover, since a negative potential is applied to the dynode 8 and a positive potential is applied to the conductive layer 13, a large accelerating voltage for a difference therebetween (an accelerating voltage of 10 kV in the case of ±5 kV) can be obtained.

Moreover, in the ion detector 1, the negative equipotential surface formed by the dynode 8 and the positive equipotential surface formed by the conductive layer 13 are substantially symmetrical with respect to the reference plane RP. Accordingly, positive ion trajectories to the dynode 8, negative ion trajectories to the conductive layer 13, and secondary electron trajectories to the scintillator 11 are converged, and the incidence efficiency of positive ions in the dynode 8, the incidence efficiency of negative ions in the conductive layer 13, and the incidence efficiency of secondary electrons in the scintillator 11 are improved.

Moreover, in the ion detector 1, when positive ions are made to enter into the chamber 2 to detect the positive ions, a negative potential is applied to the mesh 16. Accordingly, formation of a positive equipotential surface (positive electric field) into the ion entrance 3 is suppressed. Therefore, application of a negative potential to the mesh 16 when positive ions enter into the chamber 2 contributes to an improvement in the incidence efficiency of positive ions in the dynode 8. On the other hand, in the ion detector 1, when negative ions are made to enter into the chamber 2 to detect the negative ions, a positive potential is applied to the mesh 16. Accordingly, formation of a negative equipotential surface (negative electric field) into the ion entrance 3 is suppressed. Therefore, application of a positive potential to the mesh 16 when negative ions enter into the chamber 2 contributes to an improvement in the incidence efficiency of negative ions in the conductive layer 13.

Further, in the ion detector 1, the electrode layer 14 to which a positive potential is applied is formed on the scintillator 11 so as to surround the conductive layer 13. Accordingly, when negative ions enter into the chamber 2, divergence of positive ions emitted from the conductive layer 13 by negative ion collisions is suppressed. Therefore, the electrode layer 14 contributes to an improvement in the incidence efficiency of positive ions in the dynode 8 when negative ions enter into the chamber 2.

Also, in the ion detector 1, the opening 4 and the opening 6 are provided at the position opposed to the ion entrance 3, and the mesh 17 placed inside of the opening 4 is maintained at 0V. Accordingly, an electrostatic lens that converges on the dynode 8 and the conductive layer 13 is formed, and thus the occurrence of noise due to neutrality and the like is prevented.

Next, analysis results of the incidence efficiency of positive ions in the dynode 8 (hereinafter, referred to as an "incidence efficiency in the dynode 8"), the incidence efficiency of negative ions in the conductive layer 13 (hereinafter, referred to as an "incidence efficiency in the conductive layer 13"), the incidence efficiency of secondary electrons in the scintillator 11 (hereinafter, referred to as an "incidence efficiency in the scintillator 11"), and the detection efficiency of positive ions and negative ions (hereinafter, referred to as "ion detection efficiency") will be described.

Figure 2:
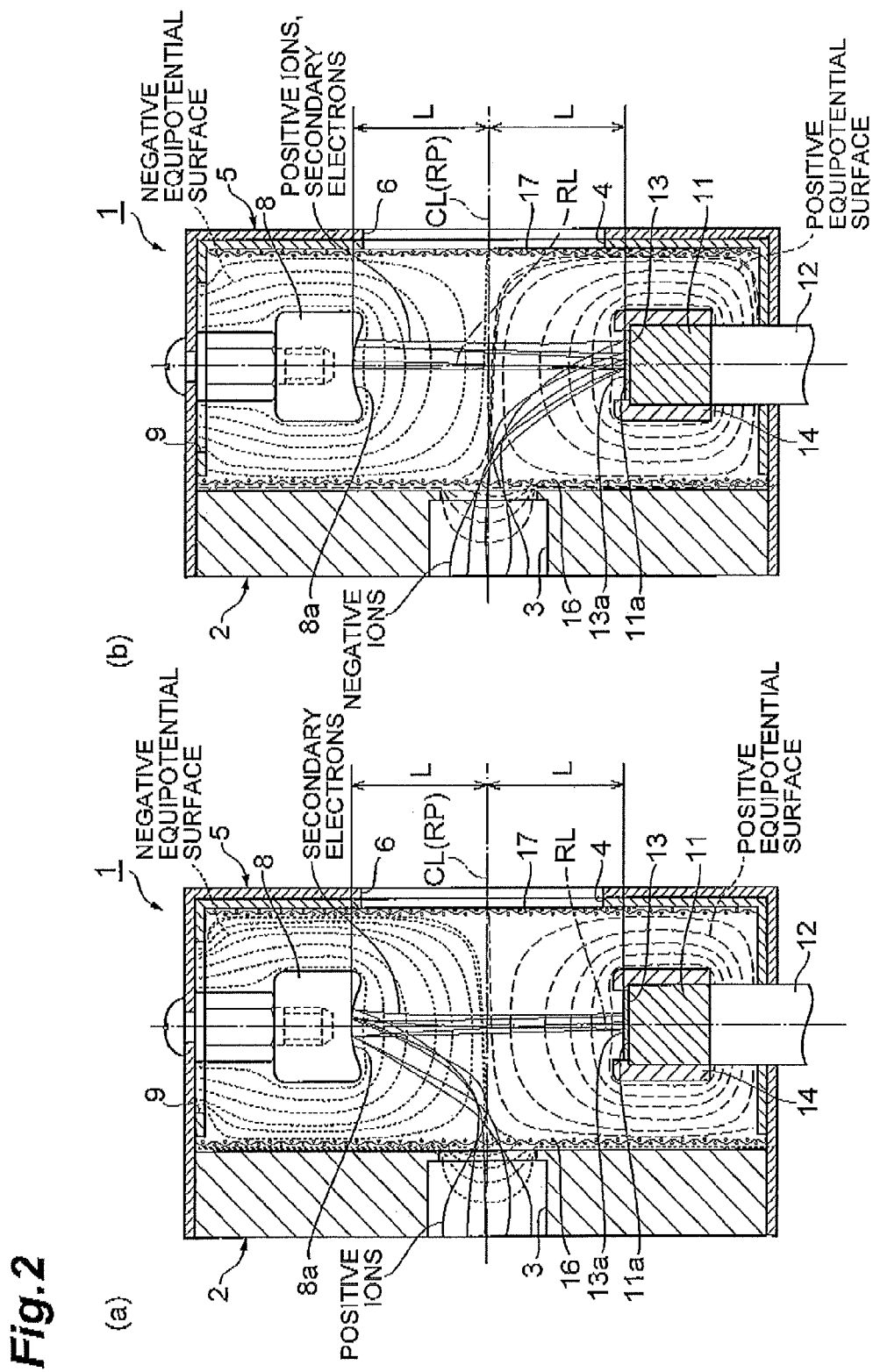
FIG. 2 includes longitudinal sectional views of the ion detector of FIG. 1 where equipotential surfaces and ion and secondary electron trajectories are shown.

With regard to the foregoing ion detector 1, analysis results of Table 1 were obtained. In this ion detector 1, as shown in FIG. 2, the distance from the reference plane RP to an ion collision surface 8a of the dynode 8 and the distance from the reference plane RP to an ion collision surface 13a of the conductive layer 13 were made substantially equal. Here, the distance L is 14 mm. Moreover, the chamber 2 and the mesh 17 were grounded and maintained at 0V. To the dynode 8, a negative potential of −5 kV was applied. On the other hand, to the conductive layer 13 and the electrode layer 14, a positive potential of +5 kV was applied. To the mesh 16, a negative potential of −0.3 kV was applied when positive ions were detected as shown in FIG. 2(a), and a positive potential of +0.3 kV was applied when negative ions were detected as shown in FIG. 2(b).

TABLE 1

|  | When positive ions were detected (the case of FIG. 2(a)) | When negative ions were detected (the case of FIG. 2(b)) |
| --- | --- | --- |
| Incidence efficiency in conductive layer 13 | — | 99.3% |
| Incidence efficiency in dynode 8 | 99.4% | 100% |
| Incidence efficiency in scintillator 11 | 99.8% | 99.6% |
| Ion detection efficiency | 99.4% | 99.2% |

As shown in Table 1, in the ion detector 1, very excellent analysis results that all incidence efficiencies and the detection efficiency exceeded 99% were obtained. Here, the incidence efficiency in the conductive layer 13 means a ratio of "negative ions that have reached the conductive layer 13" to "negative ions that have entered into the chamber 2 via the ion entrance 3." The incidence efficiency in the dynode 8 means a ratio of "positive ions that have reached the dynode 8" to "positive ions that have entered into the chamber 2 via the ion entrance 3" (the case of FIG. 2(a)) or a ratio of "positive ions that have reached the dynode 8" to "positive ions that have been emitted from the conductive layer 13" (the case of FIG. 2(b)). The incidence efficiency in the scintillator 11 means a ratio of "secondary electrons that have reached the scintillator 11" to "secondary electrons that have been emitted from the dynode 8." The ion detection efficiency means a ratio of "secondary electrons that have reached the scintillator 11" to "positive ions that have entered into the chamber 2 via the ion entrance 3" (the case of FIG. 2(a)) or a ratio of "secondary electrons that have reached the scintillator 11" to "negative ions that have entered into the chamber 2 via the ion entrance 3" (the case of FIG. 2(b)).

Figure 3:
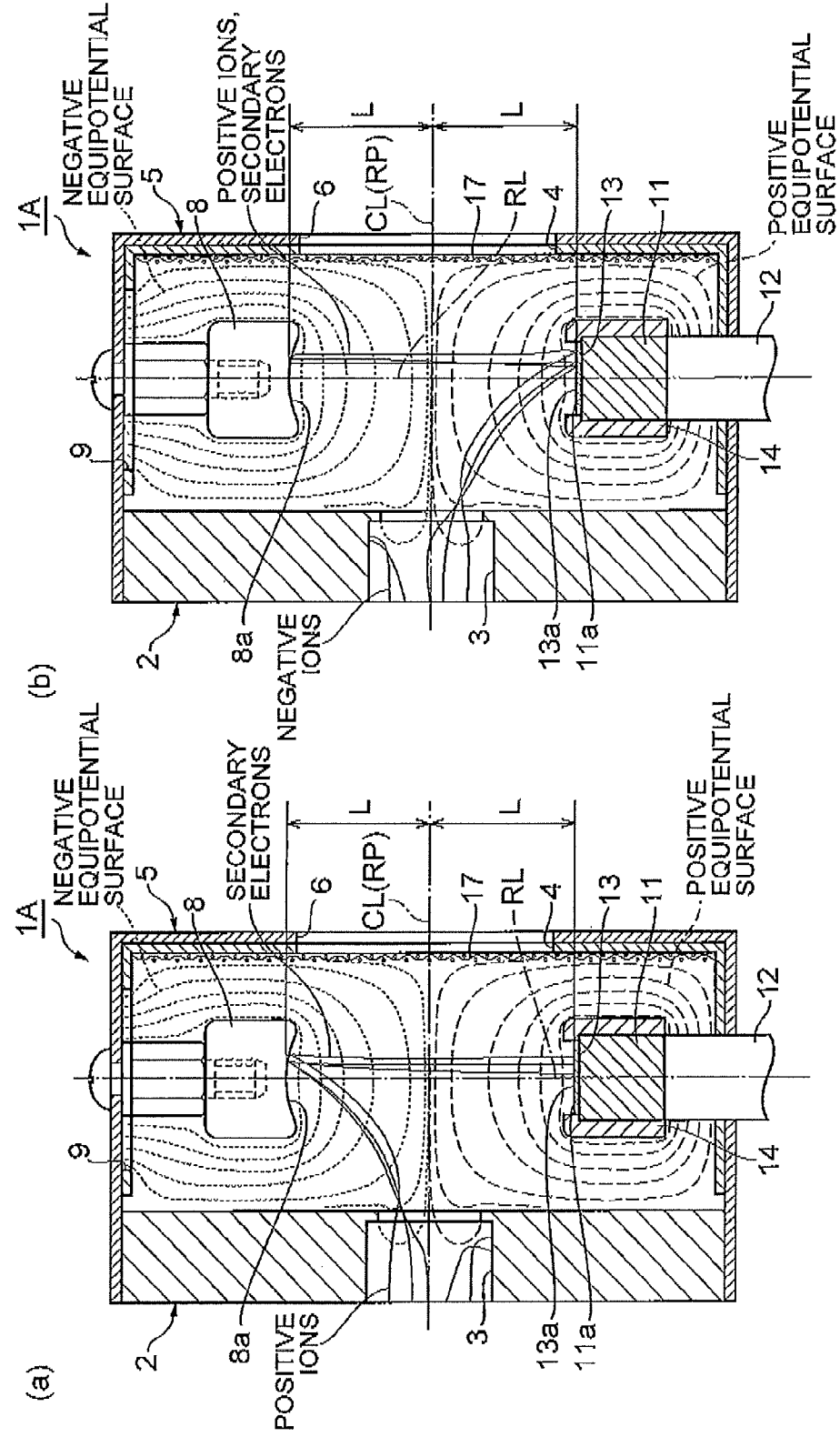
FIG. 3 includes longitudinal sectional views of another ion detector where equipotential surfaces and ion and secondary electron trajectories are shown.

With regard to an ion detector 1A of FIG. 3, analysis results of Table 2 were obtained. This ion detector 1A is different from the foregoing ion detector 1 in that, as shown in FIG. 3, no mesh 16 is provided. As shown in Table 2, in the ion detector 1A, even without the mesh 16, excellent analysis results that the ion detection efficiency exceeded 60% when positive ions were detected and the ion detection efficiency exceeded 50% when negative ions were detected were obtained. By comparison of the analysis results of Table 1 and the analysis results of Table 2, it can be understood that application of a negative potential to the mesh 16 when positive ions are detected contributes to an improvement in the incidence efficiency in the dynode 8, while application of a positive potential to the mesh 16 when negative ions are detected contributes to an improvement in the incidence efficiency in the conductive layer 13.

TABLE 2

|  | When positive ions were detected (the case of FIG. 3(a)) | When negative ions were detected (the case of FIG. 3(b)) |
| --- | --- | --- |
| Incidence efficiency in conductive layer 13 | — | 56.2% |
| Incidence efficiency in dynode 8 | 61.7% | 98.6% |
| Incidence efficiency in scintillator 11 | 99.7% | 99.9% |
| Ion detection efficiency | 61.7% | 55.4% |

Figure 4:
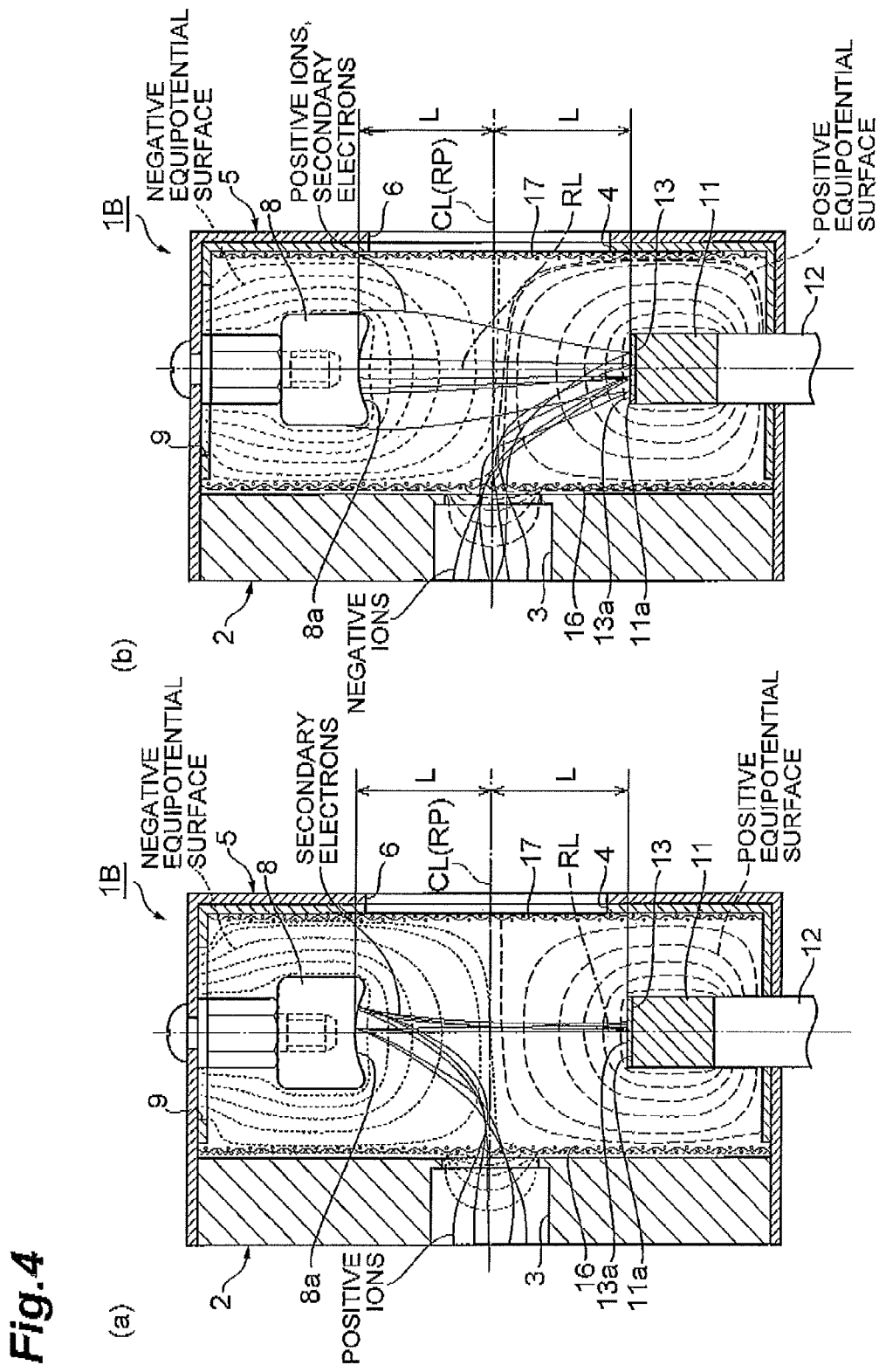
FIG. 4 includes longitudinal sectional views of another ion detector where equipotential surfaces and ion and secondary electron trajectories are shown.

With regard to an ion detector 1B of FIG. 4, analysis results of Table 3 were obtained. This ion detector 1B is different from the foregoing ion detector 1 in that, as shown in FIG. 4, no electrode layer 14 is provided. As shown in Table 3, in the ion detector 1B, even without the electrode layer 14, excellent analysis results that the ion detection efficiency exceeded 99% when positive ions were detected and the ion detection efficiency exceeded 60% when negative ions were detected were obtained. By comparison of the analysis results of Table 1 and the analysis results of Table 3, it can be understood that the electrode layer 14 contributes to an improvement in the incidence efficiency in the dynode 8 when negative ions are detected. In addition, the electrode layer 14 may be divided into a plurality of parts as long as it is disposed so as to surround the conductive layer 13.

TABLE 3

|  | When positive ions were detected (the case of FIG. 4(a)) | When negative ions were detected (the case of FIG. 4(b)) |
| --- | --- | --- |
| Incidence efficiency in conductive layer 13 | — | 98.3% |
| Incidence efficiency in dynode 8 | 99.7% | 70.1% |
| Incidence efficiency in scintillator 11 | 98.8% | 94.1% |
| Ion detection efficiency | 99.7% | 67.7% |

Figure 5:
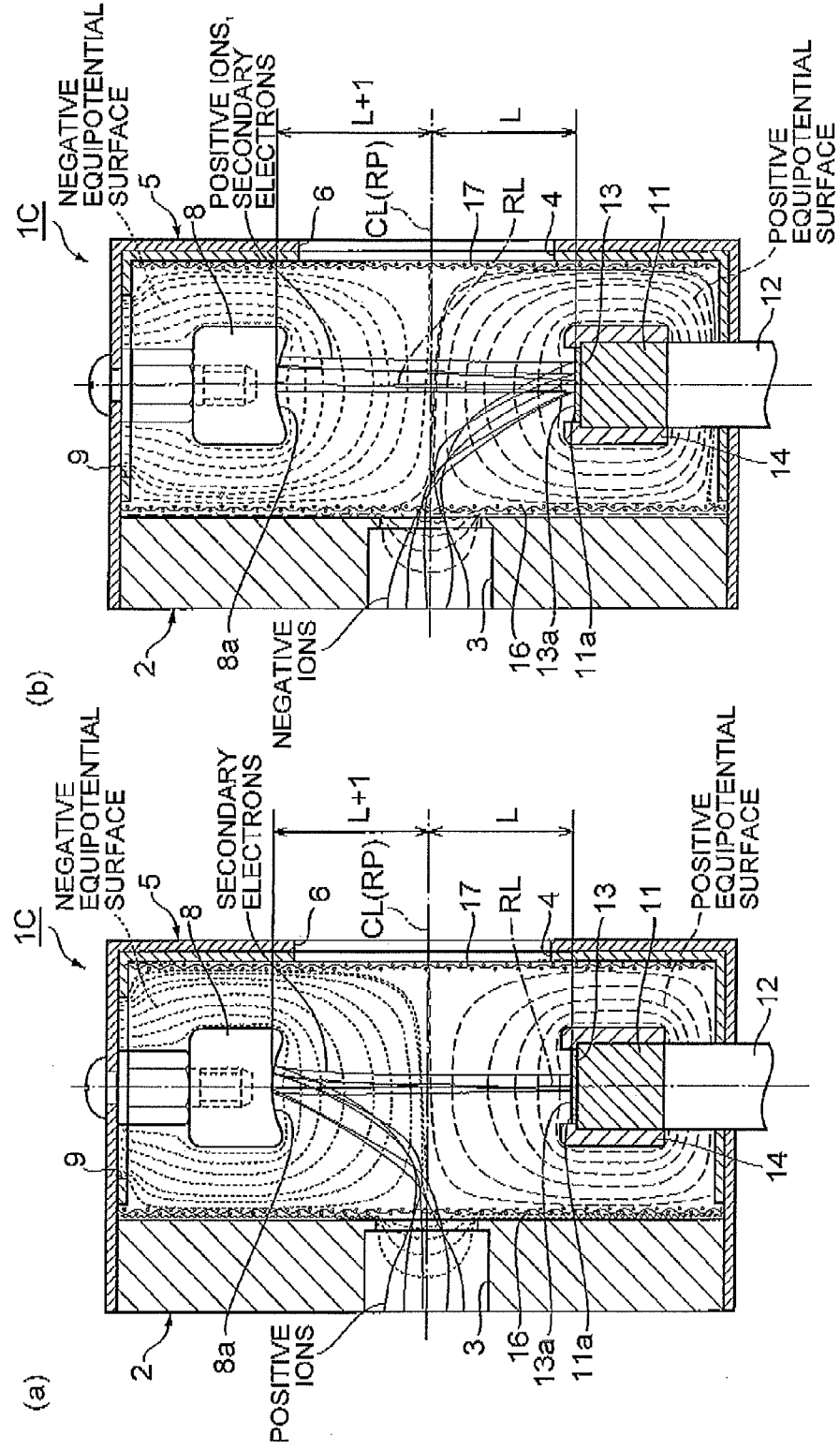
FIG. 5 includes longitudinal sectional views of another ion detector where equipotential surfaces and ion and secondary electron trajectories are shown.

With regard to an ion detector 1C of FIG. 5, analysis results of Table 4 were obtained. This ion detector 1C is different from the foregoing ion detector 1 in that, as shown in FIG. 5, the distance from the reference plane RIP to the ion collision surface 8a of the dynode 8 is longer by 1 mm than the distance from the reference plane RP to the ion collision surface 13a of the conductive layer 13 and that a negative potential of −6 kV was applied to the dynode 8. As shown in Table 4, in the ion detector 1C, very excellent analysis results that all incidence efficiencies and the detection efficiency exceeded 99% were obtained.

TABLE 4

|  | When positive ions were detected (the case of FIG. 5(a)) | When negative ions were detected (the case of FIG. 5(b)) |
| --- | --- | --- |
| Incidence efficiency in conductive layer 13 | — | 99.2% |
| Incidence efficiency in dynode 8 | 99.7% | 100% |
| Incidence efficiency in scintillator 11 | 99.7% | 99.8% |
| Ion detection efficiency | 99.7% | 99.2% |

Figure 6:
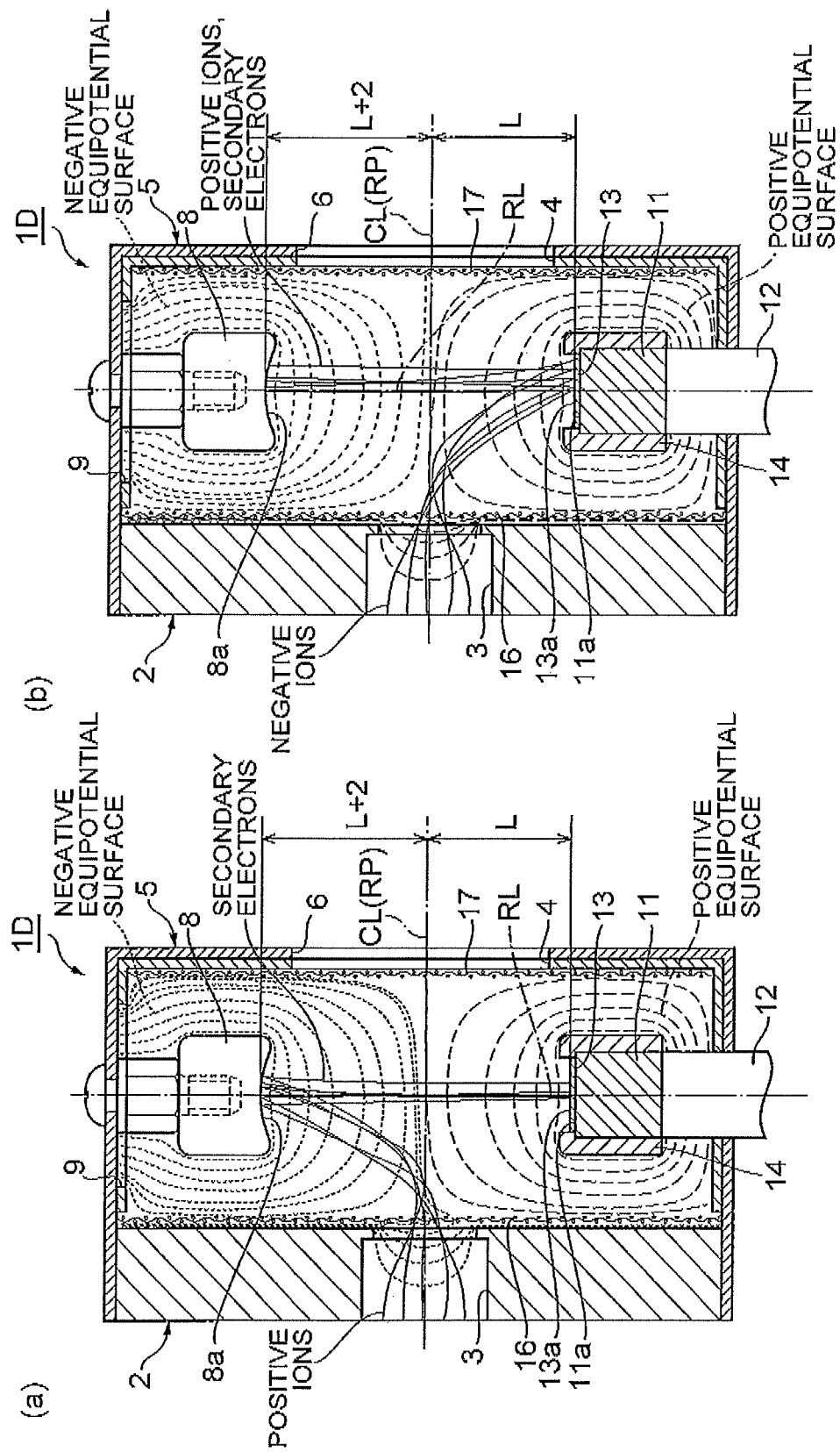
FIG. 6 includes longitudinal sectional views of another ion detector where equipotential surfaces and ion and secondary electron trajectories are shown.

With regard to an ion detector 1D of FIG. 6, analysis results of Table 5 were obtained. This ion detector 1D is different from the foregoing ion detector 1 in that, as shown in FIG. 6, the distance from the reference plane RP to the ion collision surface 8a of the dynode 8 is longer by 2 mm than the distance from the reference plane RP to the ion collision surface 13a of the conductive layer 13 and that a negative potential of −6 kV was applied to the dynode 8. As shown in Table 5, in the ion detector 1D, very excellent analysis results that the ion detection efficiency exceeded 99% when positive ions were detected and the ion detection efficiency exceeded 90% when negative ions were detected were obtained.

TABLE 5

|  | When positive ions were detected (the case of FIG. 6(a)) | When negative ions were detected (the case of FIG. 6(b)) |
| --- | --- | --- |
| Incidence efficiency in conductive layer 13 | — | 97.0% |
| Incidence efficiency in dynode 8 | 99.7% | 99.6% |
| Incidence efficiency in scintillator 11 | 99.7% | 99.6% |
| Ion detection efficiency | 99.6% | 96.5% |

Figure 7:
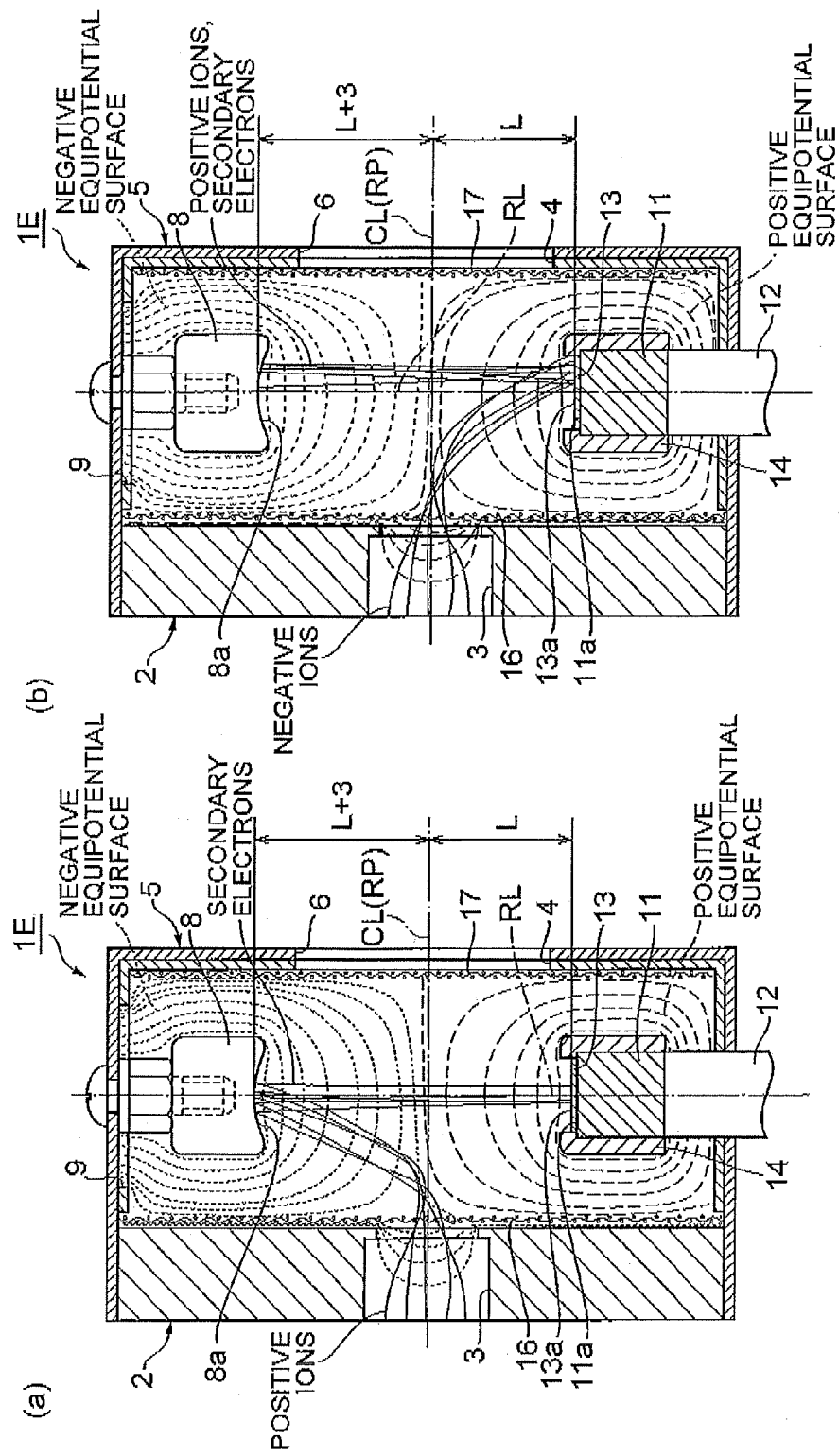
FIG. 7 includes longitudinal sectional views of another ion detector where equipotential surfaces and ion and secondary electron trajectories are shown.

With regard to an ion detector 1E of FIG. 7, analysis results of Table 6 were obtained. This ion detector 1E is different from the foregoing ion detector 1 in that, as shown in FIG. 7, the distance from the reference plane RP to the ion collision surface 8a of the dynode 8 is longer by 3 mm than the distance from the reference plane RP to the ion collision surface 13a of the conductive layer 13 and that a negative potential of −6 kV was applied to the dynode 8. As shown in Table 6, in the ion detector 1E, very excellent analysis results that the ion detection efficiency exceeded 99% when positive ions were detected and the ion detection efficiency exceeded 80% when negative ions were detected were obtained,

TABLE 6

|  | When positive ions were detected (the case of FIG. 7(a)) | When negative ions were detected (the case of FIG. 7(b)) |
| --- | --- | --- |
| Incidence efficiency in conductive layer 13 | — | 84.8% |
| Incidence efficiency in dynode 8 | 99.2% | 99.2% |
| Incidence efficiency in scintillator 11 | 99.8% | 99.3% |
| Ion detection efficiency | 99.2% | 84.0% |

Here, the following can be said from the analysis results of Table 4 to Table 6 regarding the ion detectors 1C to 1E of FIG. 5 to FIG. 7. Specifically, it suffices to locate the dynode 8 and the conductive layer 13 with respect to the ion entrance 3 so that the reference plane RP substantially perpendicular to the reference line RL includes the center line CL of the ion entrance 3 and to apply a negative potential to the dynode 8 and apply a positive potential to the conductive layer 13 so that the negative equipotential surface formed by the dynode 8 and the positive equipotential surface formed by the conductive layer 13 become substantially symmetrical with respect to the reference plane RP. More specifically, it suffices to increase the absolute value of a negative potential to be applied to the dynode 8 as the distance from the reference plane RP to the ion collision surface 8a of the dynode 8 is increased and to increase the absolute value of a positive potential to be applied to the conductive layer 13 as the distance from the reference plane RP to the ion collision surface 13a of the conductive layer 13 is increased.

[Second Embodiment]

Figure 8:
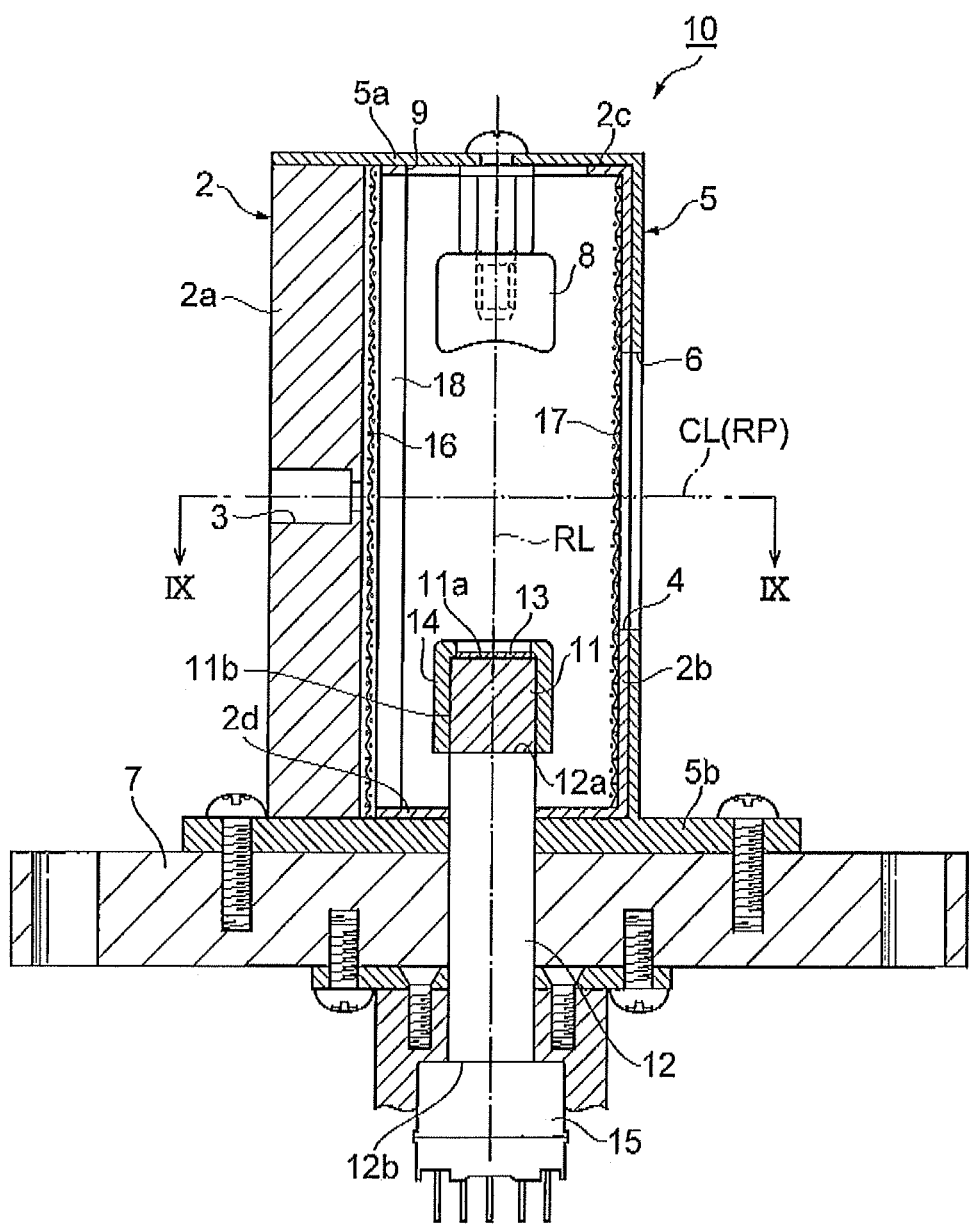
FIG. 8 is a longitudinal sectional view of an ion detector of a second embodiment of the present invention.
Figure 9:
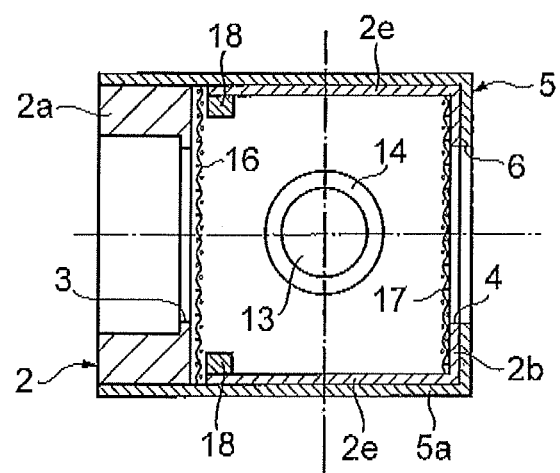
FIG. 9 is a sectional view taken along a line IX-IX of the ion detector of FIG. 8.

As shown in FIG. 8 and FIG. 9, an ion detector 10 is different from the foregoing ion detector 1 mainly in that a pair of electrode members 18 for converging trajectories of positive ions and negative ions that enter into the chamber 2 via the ion entrance 3 are disposed in the chamber 2.

The pair of electrode members 18 are located downstream of the mesh 16 and upstream of the dynode 8 and the conductive layer 13 (here, immediately behind the mesh 16) in the traveling direction of positive ions and negative ions that enter into the chamber 2 via the ion entrance 3. That is, the pair of electrode members 18 are located closer to the ion entrance 3 side than the dynode 8 and the conductive layer 13. Further, the pair of electrode members 18, when viewed from the ion entrance 3 side, face each other across the ion entrance 3 in a direction substantially perpendicular to the direction in which the dynode 8 and the conductive layer 13 are opposed (that is, a direction substantially perpendicular to the reference line RL and the center line CL).

Each electrode member 18 is a prism-shaped member having a sectional shape of a rectangular shape, and is made of a metal such as, for example, SUS. Each electrode member 18 in contact with an inner surface of a side wall 2e of the chamber 2 is stretched between the top wall 2c and the bottom wall 2d of the chamber 2, and is physically and electrically connected with the chamber 2. Accordingly, each electrode member 18 has the same potential (namely, 0V) as that of the chamber 2. In addition, the sectional shape of the electrode member 18 is not limited to a rectangular shape, and may be a circular shape or the like. Moreover, it suffices that the length of the electrode member 18 in the direction in which the dynode 8 and the conductive layer 13 are opposed is equal to or more than the width of the ion entrance 3 in said direction.

Here, the ion entrance 3 is formed so as to have a sectional shape of a rectangular shape taking as its longitudinal direction the direction in which the pair of electrode members 18 are opposed (that is, the direction substantially perpendicular to the reference line EL and the center line CL). In addition, the sectional shape of the ion entrance 3 may be an oval shape, an elliptic shape, and the like as long as it is a sectional shape taking as its longitudinal direction the direction in which the pair of electrode members 18 are opposed.

According to the ion detector 10 configured as in the above, the following effects are provided, in addition to the same effects as those of the foregoing ion detector 1. That is, according to the ion detector 10, even when the ion entrance 3 is formed so as to have a sectional shape taking as its longitudinal direction the direction in which the pair of electrode members 18 are opposed, positive ion trajectories to the dynode 8 and negative ion trajectories to the conductive layer 13 can be converged so as to further improve the incidence efficiency of positive ions in the dynode 8 and the incidence efficiency of negative ions in the conductive layer 13.

Next, analysis results of the incidence efficiency of positive ions in the dynode 8 (hereinafter, referred to as an "incidence efficiency in the dynode 8"), the incidence efficiency of secondary electrons in the scintillator 11 (hereinafter, referred to as an "incidence efficiency in the scintillator 11"), and the detection efficiency of positive ions will be described. In addition, analysis results of the incidence efficiency of negative ions in the conductive layer 13 and the detection efficiency of negative ions are omitted because these are the same as those in the case of positive ions.

Figure 10:
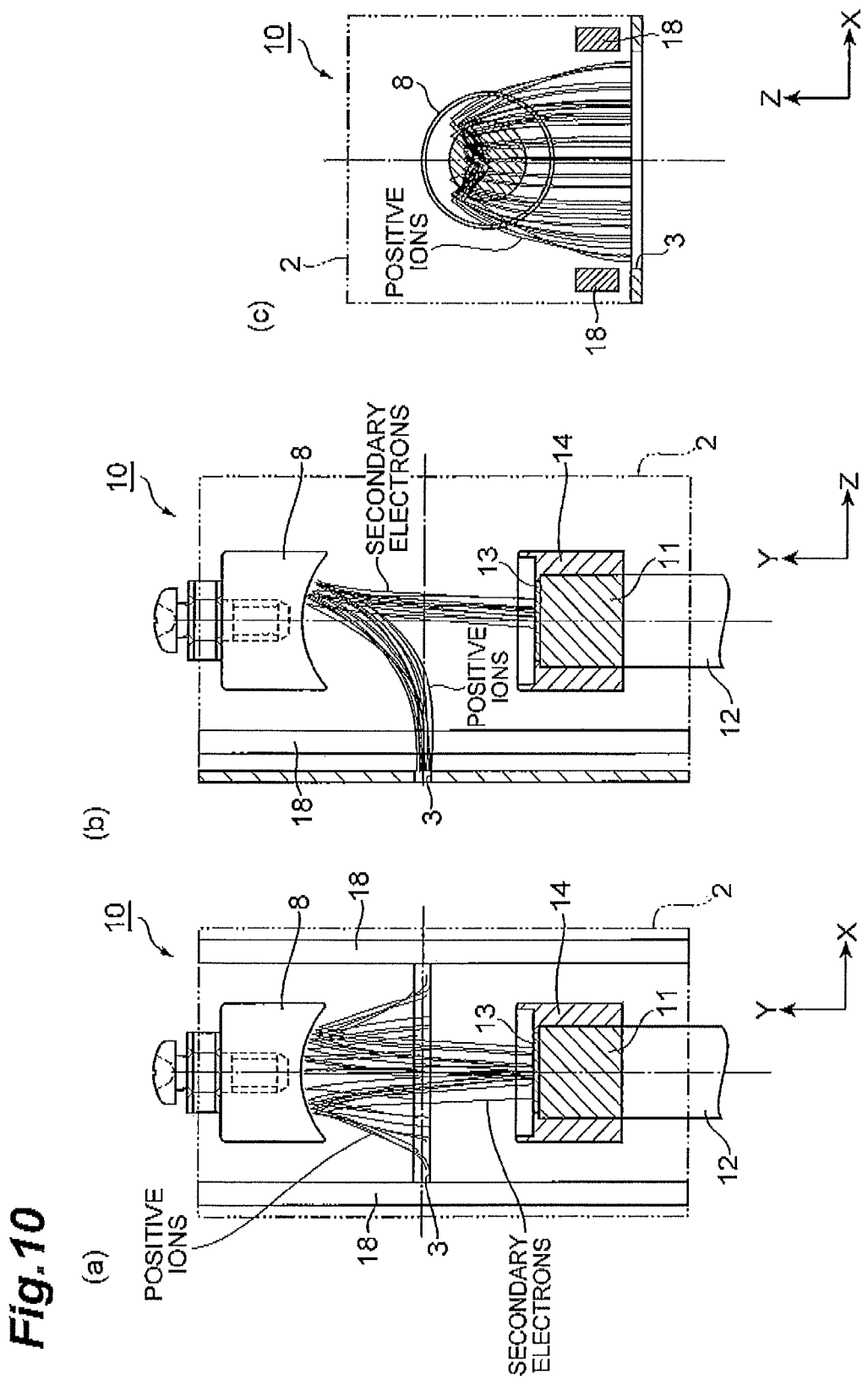
FIG. 10 includes longitudinal sectional views of the ion detector of FIG. 8 where ion and secondary electron trajectories are shown.
Figure 11:
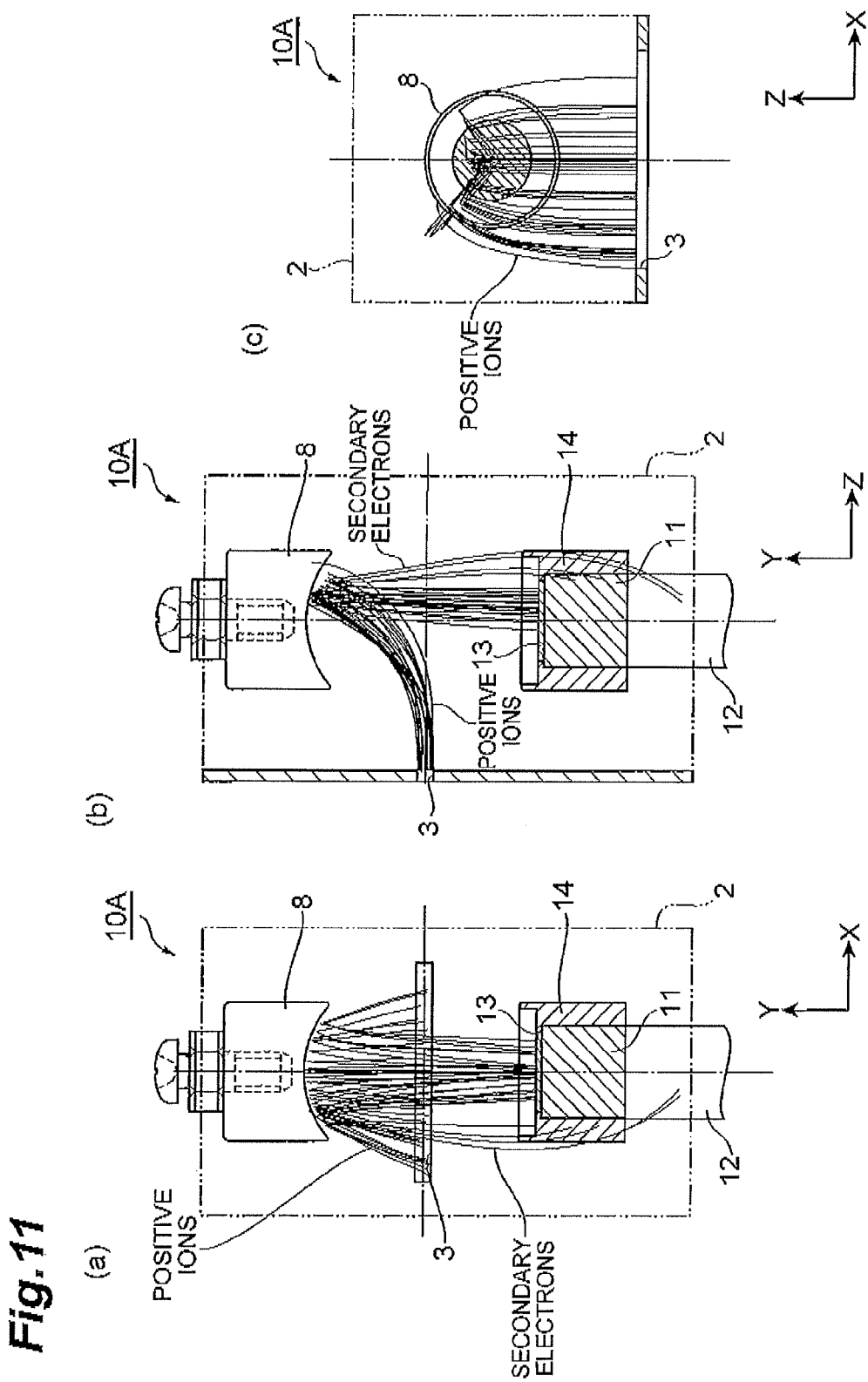
FIG. 11 includes longitudinal sectional views of another ion detector where ion and secondary electron trajectories are shown.

Here, as shown in FIG. 10, the foregoing ion detector 10 was prepared. In this ion detector 10, the ion entrance 3 was formed so as to have a sectional shape of a rectangular shape taking as its longitudinal direction the direction in which the pair of electrode members 18 are opposed, and the width of the ion entrance 3 in the longitudinal direction was provided as approximately 1.6 times as wide as the outer diameter of the dynode 8 and the electrode layer 14. Moreover, as shown in FIG. 11, an ion detector 10A that is different from the ion detector 10 only in that no electrode members 18 are provided was prepared. Then, the chamber 2 and the mesh 17 (in the ion detector 10, the electrode members 18 as well) were grounded and maintained at 0V. To the dynode 8, a negative potential of −5 kV was applied. On the other hand, to the conductive layer 13 and the electrode layer 14, a positive potential of +5 kV was applied. To the mesh 16, a negative potential of −0.5 kV was applied.

As a result, analysis results of Table 7 were obtained with regard to each of the ion detectors 10, 10A. As shown in Table 7, in the ion detector 10A, even without the electrode members 18, an excellent analysis result that the incident efficiency in the dynode 8 exceeded 90% was obtained. On the other hand, in the ion detector 10, more excellent analysis results that the incident efficiency in the dynode 8 and the positive ion detection efficiency exceeded 99% were obtained. By comparison of these analysis results, it can be understood that the existence of the electrode members 18 contributes to an improvement in not only the incident efficiency in the dynode 8 but also the positive ion detection efficiency (the same applies to the incidence efficiency of negative ions in the conductive layer 13 and the negative ion detection efficiency). Also by comparison of FIG. 10(*c*) and FIG. 11(*c*), it can be understood that positive ion trajectories shown in FIG. 10(*c*) including their outer part are converged to the dynode 8, while positive ion trajectories shown in FIG. 11(*c*) are not converged at their outer part to the dynode 8.

TABLE 7

|  | The case of ion detector 10 (the case of FIG. 10) | The case of ion detector 10A (the case of FIG. 11) |
| --- | --- | --- |
| Incidence efficiency in dynode 8 | 99.1% | 94.6% |
| Incidence efficiency in scintillator 11 | 93.7% | 87.2% |
| Positive ion detection efficiency | 99.1% | 89.7% |

[Third Embodiment]

Figure 12:
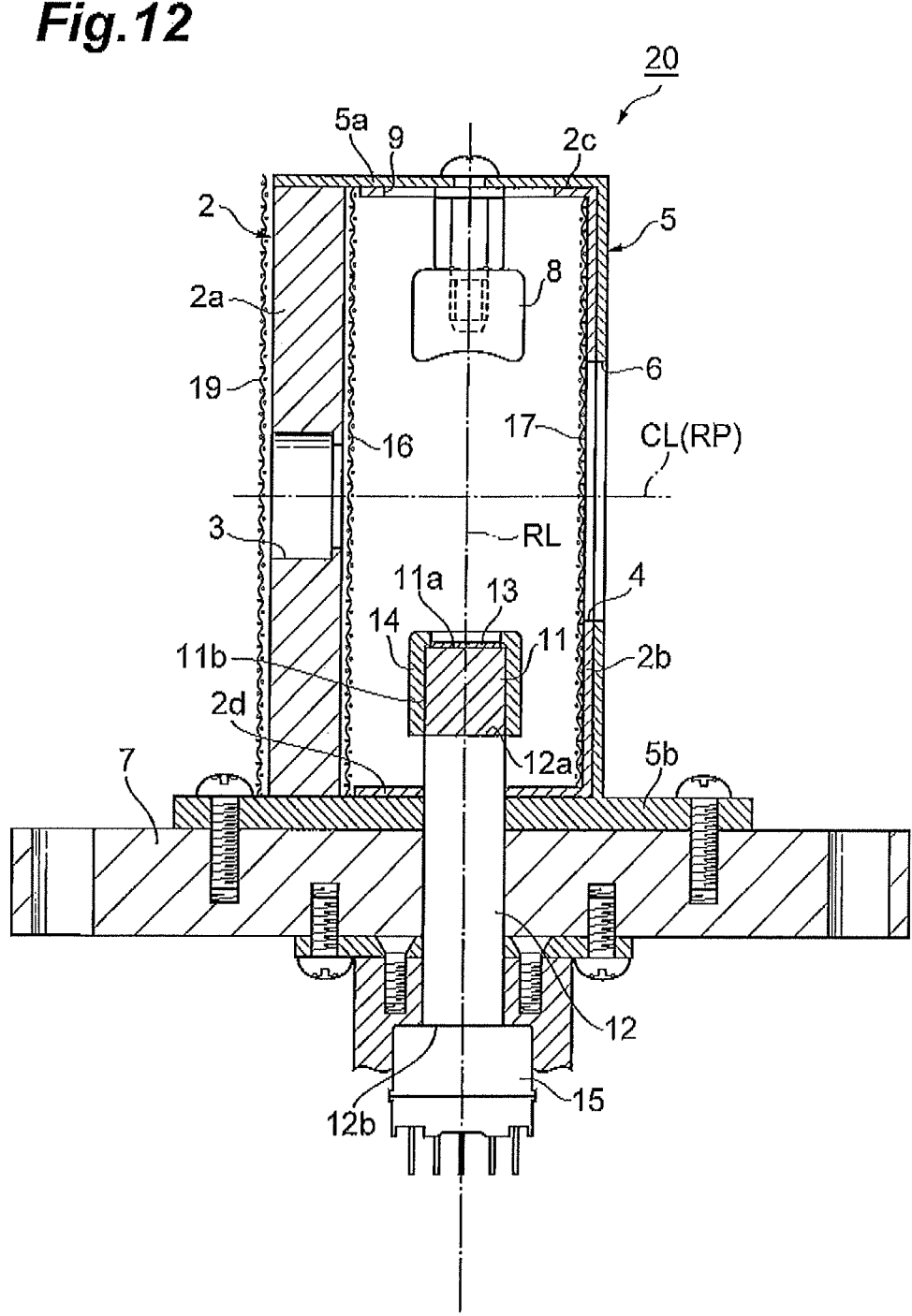
FIG. 12 is a longitudinal sectional view of an ion detector of a third embodiment of the present invention.

As shown in FIG. 12, an ion detector 20 is different from the foregoing ion detector 1 mainly in that a mesh (second mesh) 19 is placed at the ion entrance 3.

The mesh 19 is made of SUS, and is woven outside of the ion entrance 3 so as to extend along an outer surface of the side wall 2*a* of the chamber 2. That is, the mesh 19 is located at an outer side than the mesh 16. To the mesh 19, a positive potential and a negative potential are selectively applied so as to have an absolute value smaller than that of a potential to be applied to the mesh 16 and so as to have a polarity opposite to that of a potential to be applied to the mesh 16. For example, positive ions are detected, a negative potential of −300V is applied to the inner mesh 16, and a positive potential of +20V is applied to the outer mesh 19. On the other hand, when negative ions are detected, a positive potential of +300V is applied to the inner mesh 16, and a negative potential of −20V is applied to the outer mesh 19.

According to the ion detector 20 configured as in the above, the following effects are provided, in addition to the same effects as those of the foregoing ion detector 1. That is, according to the ion detector 20, when positive ions are made to enter into the chamber 2 to detect the positive ions, by applying a positive potential to the outer mesh 19, as shown in FIG. 13(*a*), positive ions PI(l) of relatively low energies can be repulsed so as to pass only positive ions PI(h) of relatively high energies. At this time, negative ions NI are repulsed by the inner mesh 16 to which a negative potential has been applied. On the other hand, when negative ions are made to enter into the chamber 2 to detect the negative ions, by applying a negative potential to the outer mesh, as shown in FIG. 13(*b*), negative ions NI(l) of relatively low energies can be repulsed so as to pass only negative ions NI(h) of relatively high energies. At this time, positive ions PI are repulsed by the inner mesh 16 to which a positive potential has been applied. Thus, since entrance into the chamber 2 of ions of relatively low energies out of the ions that need to be detected can be prevented, the S/N ratio of the ion detector 20 can be improved.

In addition, the value of voltage to be applied to the outer mesh 19 when positive ions are detected can be appropriately adjusted in a range of, for example, +5V to +100V according to the maximum value of energy of negative ions that need to be repulsed as noise. Similarly, the value of voltage to be applied to the outer mesh 19 when negative ions are detected can be appropriately adjusted in a range of, for example, −5V to −100V according to the maximum value of energy of positive ions that need to be repulsed as noise.

In the above, a plurality of embodiments of the present invention have been described, but the present invention is not limited to the above-described embodiments. For example, in place of the photomultiplier tube 15, another photodetector may be used as long as it can detect light emitted by the scintillator 11 in response to the incidence of secondary electrons.

Figure 14:
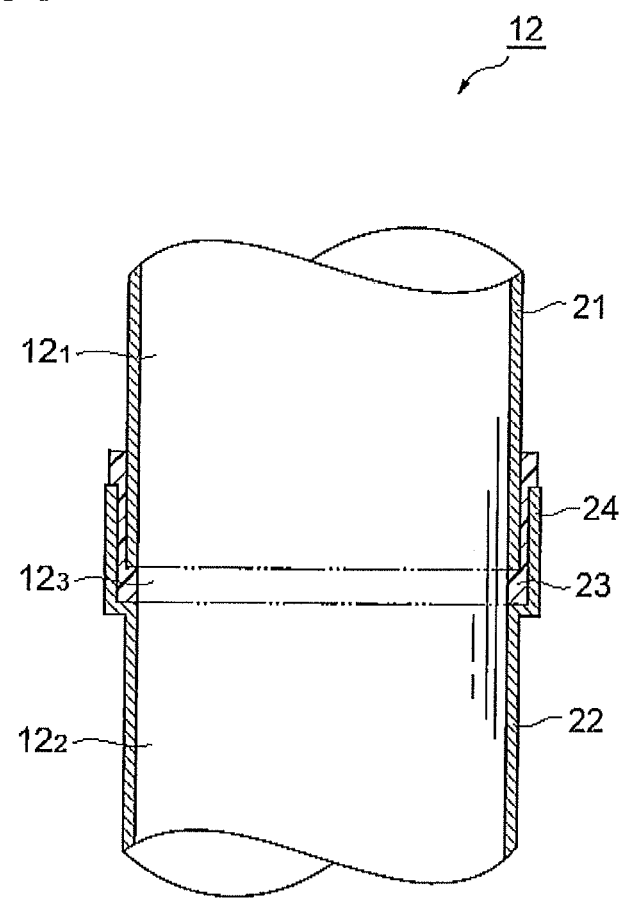
FIG. 14 is a longitudinal sectional view of a light guide of the ion detector of each embodiment.

Moreover, as shown in FIG. 14, a part (first part) 12$_1$ at one end 12 side of the light guide 12 may be covered with a conductive film (first conductive film) 21*a*, a part (second part) 12$_2$ at the other end 12*b* side of the light guide 12 may be covered with a conductive film (second conductive film) 22, and a part (third part) 12$_3$ between the part 12$_1$ and the part 12$_2$ of the light guide 12 may be covered with an insulating film 23. Further, the part 12$_3$ may be covered with a conductive film (third conductive film) 24 via the insulating film 23. Here, the conductive film 24 is formed integrally with the conductive film 22. That is, the conductive film 24 is connected to the conductive film 22, while the conductive film 24 is separated from the conductive film 21. In addition, the conductive films 21, 22, and 24 are made of a metal such as, for example, aluminum, and the insulating film 23 is made of a resin such as, for example, polyimide.

According to the light guide 12 thus configured, incidence of light into the light guide 12 from the outside can be prevented by the conductive films 21, 22, and 24, and leakage of light in the light guide 12 to the outside can be prevented to propagate the light to the photomultiplier tube 15. Further, the conductive film 21 and the conductive film 22 can be insulated from each other by the insulating film 23. Thus, by insulating the conductive film 21 and the conductive film 22 from each other, the photomultiplier tube 15 can be made electrically independent of the scintillator 11 (conductive layer 13).

In addition, the conductive film 24 may be formed integrally with the conductive film 21. That is, the conductive film 24 may be connected to the conductive film 21, while the conductive film 24 may be separated from the conductive film 22. Alternatively, as shown in FIG. 15(*a*), the conductive film 24 may be separated from both of the conductive film 21 and the conductive film 22. Moreover, as shown in FIG. 15(*b*), when the insulating film 23 has a sufficient light blocking effect, the part 12$_3$ may be covered only with the insulating film 23.

What is claimed is:

1. An ion detector for detecting positive ions and negative ions, comprising:
   a housing provided with an ion entrance to make the positive ions and the negative ions enter;
   a conversion dynode which is disposed in the housing and to which a negative potential is applied;
   a scintillator which is disposed in the housing and has an electron incident surface which is opposed to the conversion dynode and into which secondary electrons emitted from the conversion dynode are made incident;
   a conductive layer which is formed on the electron incident surface and to which a positive potential is applied; and
   a photodetector which detects light emitted by the scintillator in response to incidence of the secondary electrons, and
   further comprising a pair of electrode members which are made to have the same potential as that of the housing and which are disposed in the housing so as to be located closer to the ion entrance side than the conversion dynode and the conductive layer and so as to face each other across the ion entrance, when viewed from the ion entrance side, in a direction substantially perpendicular to a direction in which the conversion dynode and the conductive layer are opposed.

* * * * *